United States Patent [19]

Bodkin

[11] Patent Number: 4,843,514

[45] Date of Patent: Jun. 27, 1989

[54] ELECTRICAL CONNECTION SENTRY SYSTEM

[76] Inventor: Lawrence E. Bodkin, 1149 Molokai Rd., Jacksonville, Fla. 32216

[21] Appl. No.: 273,834

[22] Filed: Nov. 21, 1988

[51] Int. Cl.⁴ .......................... H02H 3/04; H02H 5/10
[52] U.S. Cl. ........................................ 361/50; 361/49; 361/100; 361/102; 307/99; 307/326; 340/652; 340/656; 324/133; 324/508; 174/5 SG
[58] Field of Search ........................ 361/1, 2, 3, 42, 47, 361/48, 49, 50, 93, 100, 102; 307/98, 99, 127, 326; 324/133, 508, 509; 340/531, 532, 635, 652, 654, 656; 174/5 R, 5 SG

[56] References Cited

U.S. PATENT DOCUMENTS

| | | | |
|---|---|---|---|
| 3,242,382 | 3/1966 | Rogers, Sr. | 361/49 |
| 3,407,336 | 10/1968 | Embree | 340/656 |
| 3,809,961 | 5/1974 | Kershaw | 361/50 |
| 3,864,581 | 2/1975 | Satyanarayana | 361/49 |
| 4,346,419 | 8/1982 | Janniello | 361/100 |
| 4,447,844 | 5/1984 | Schossow et al. | 361/1 X |
| 4,707,759 | 11/1987 | Bodkin | 361/48 |
| 4,709,293 | 11/1987 | Gershen et al. | 361/50 |

Primary Examiner—Roy N. Envall, Jr.
Assistant Examiner—H. L. Williams

[57] ABSTRACT

Positive assurance of correct connection, in supplying electrical utilization equipment from a current source, is provided when it is critical to safety and particularly when receptacle outlets are used or a fixed wiring installation required which may be subject to wiring error. An electromagnetic relay is employed to prevent equipment use and to provide audible indication in the event of hazardous connective error such as reversal of ungrounded and grounded neutral conductors and the omission of a grounding connection. The relay may be one that is also otherwise controlled for on-off power switching.

12 Claims, 1 Drawing Sheet

ELECTRICAL CONNECTION SENTRY SYSTEM

BACKGROUND OF THE INVENTION

Electrical safety standards have been established to assure that basic precautionary steps are taken to prevent the more readily avoidable mishaps, and while more sophisticated fault detection devices can offer special protection, most electrical devices must rely upon adherence to basic, established standards and practices to reduce the possibilities of shock and fire. Unfortunately, many of the basic protections are nullified by simple connective errors in receptacle outlets or in appliance installations. Plug and socket design can provide a positive assurance that plugs are inserted correctly and cord set wiring is most frequently well controlled as a matter of standardized manufacture, but wiring of receptacle outlets or of installed utilization equipment is another matter and generally subject to many individual circumstances.

This invention relates to the protection of electrical utilization equipment which has critical safety requirements in its connection to a current source, wherein reversal of ungrounded and grounded neutral conductors or the absence of a connection to a grounding conductor for grounding of exposed noncurrent carrying conductive parts of the equipment would constitute a hazardous condition.

While plug-in test devices are available that connect indicator lamps across the outlet terminals to provide information of wiring errors, the extent of use and response to their indications is discretionary and such devices have no positive protective function.

It is well understood that providing this invention may be cost prohibitive, in many instances. It can however, be very inexpensively incorporated into the design of various power control devices which already employ a relay for load current switching, such as many of the faul interrupters and other devices which turn current on and off in accordance with such factors as changes in temperature, light intensity or the reception of radio or infra-red signals. It may actually save money in many instances by eliminating extra relay contacts where it has been considered necessary to interrupt both the grounded and the ungrounded conductor in order to avoid the hazardous contingency of their possible reversal.

A more expensive relay operated system that provides connective protection with interruption of both the grounded and ungrounded conductors, is disclosed in an embodiment of the "Universal Fault Circuit Interrupter", as it appears in U.S. Pat. No. 4,707,759, dated Nov. 17, 1987. The patented system employs a set of normally closed contacts that connect the ground side of the relay coil to the grounding conductor. This serves to supply only an initial energizing current with the ground side of the coil being reconnected to the grounded conductor upon closure of the relay as a set of normally open contacts close simultaneously with two other sets of normally open contacts that act to connect the ungrounded and the grounded conductor to the load. This prior patented system will not be energized if a grounding connection is initially absent but will not be deenergized if the grounding connection is interrupted during use, as it will be with the present invention. A direct connection of the relay coil to the grounding conductor, which would permit continuous monitoring of the grounding connection, was not provided in the patented system, since this would pass a small but continuing line current into the grounding conductor, which is not to be employed as a current carrying conductor, with regard to the supplying of current from the source to utilization equipment.

In accordance with the present invention, only a single pole, single throw relay is used to open and close the connection of the ungrounded conductor to the load. In most prototype embodiments, heretofore made, the relay has been a very compact and inexpensive d.c. coil power type, designed for printed circuit use, and soon to be produced with an a.c. coil, having contacts capable of switching 30 amperes at 240 volts. This and other small relays with even higher current carrying capacities may be obtained at relatively low cost, which further enhances the usefulness of the invention. Other components, exclusive of hardware, are a pair of rectifier diodes and an optional control which may be a small manually operated switch, or another switching element such as a thyristor.

SUMMARY OF THE INVENTION

Specific aspects of the preferred embodiment include an electromagnetic, single pole, single throw, relay having normally open contacts arranged to connect utilization equipment to the ungrounded conductor from an alternating current source, upon closure. The coil of the relay is connected across the line, from ungrounded to grounded conductor, in series with a first unidirectional blocking means, so as to receive only half-wave power from the alternating current source. If the relay is also to be used to switch load current, the coil may be connected in series with an optional control, which may comprise a small manual switch, or other switching device such as a thyristor. If the thyristor provides only half-wave current from the source and is included in circuitry that is unaffected by, or not connected to receive a reverse current, it may be considered to replace a rectifier diode used as the first blocking means and such diode may be omitted.

This sentry system may be used to provide connective protection where the current source supplies direct rather than alternating current and may even be used when the current is continuous, if the switching element of the control, such as a thyristor, is part of a "chopper" circuit and can cause the current through the coil to be regularly intermittent or pulsating.

In accord with this invention, many relays do not close properly when energized by half-wave or pulsating direct current and tend to act and sound like a buzzer, with the armature vibrating at line frequency, unless some special circuit provisions are made, such as the connection of a second unidirectional blocking means or rectifier across the coil as a "free wheeling" diode to carry the inductive current generated by collapse of the coil's magnetic field between pulses of the pulsating direct current.

A d.c. type of coil may sometimes be used, but if a control thyristor limits current to the coil by means of phase control, an a.c. type of coil may be required to prevent buzzing, even when armature-core gap is adjusted and there is assistance from a "free wheeling" current flow. Some relay designs may permit proper closure on half-wave current, without "free wheeling" assistance and may require an increase in the gap between armature and core to obtain the buzzer effect. A silent or buzzerless protection may be obtainable, with the sentry system, by properly selecting coil and gap combinations.

In accord with this invention, a rectifier diode, used as the "free wheeling" second unidirectional blocking means, is not connected directly across the coil, but is connected from one side of the coil, where connection is also made with the first diode or to a thyristor, to the line intended for connection to the grounding conductor rather than to the other side of the coil, which is correctly connectable to the grounded neutral. The orientation of the second diode blocks any passage of current from the ungrounded conductor to the grounding conductor, but does permit the closed circuit passage of the inductively generated coil current which reaches the grounding conductor from the grounded neutral conductor, by virtue of their common service grounding.

In operation, an absence of the grounding conductor interrupts the "free wheeling" circuit, thus preventing proper relay closure and producing a buzzer sound as an indication of wiring error.

If the ungrounded and grounded neutral conductors are reversed and the grounding connection is absent, current is half-wave, without "free wheeling" effect, closure thus being prevented and the buzzer sound preferably being produced. If the grounding connection is present, in such an instance, the diodes connect the coil to grounded and grounding conductors in parallel to furnish only half-wave current, prevent closure and produce the buzzer sound.

If the ungrounded and grounding conductors are reversed, the second diode functions as though it is the first and the first functions as the "free wheeling" diode to permit relay closure but the utilization equipment or load to be energized cannot receive current from the source. Such a wiring error is the least probable, and would be temporary, even without the sentry system, since equipment would be inoperable and command immediate attention and also would frequently cause immediate shorting when a receptacle is mounted in a conductive junction box, grounded by conductive conduit, hazardous errors, of this less than likely type, would be expected only in makeshift extensions or additions, made without benefit of conductive conduit. A reversal of grounded and grounding connections is regarded as non-hazardous in the immediate sense.

An object of this invention is to prevent use of electrical utilization equipment wherein there is a reversal of connections to ungrounded and grounded conductors from an alternating current source.

Another object is to prevent use of such equipment wherein there is no provision for connection to a grounding conductor. A related object is to require connection of a grounding conductor, to the sentry system, even where the grounding conductor is not to be connected to the equipment, to serve as a reference source of ground potential, and assure the proper polarity of the ungrounded and grounded connections.

Still another object is to interrupt use of such equipment if connective error, such as interruption of the grounding conductor, occurs during use. Another related object is to provide a means to eliminate the need and expense of the precautionary practice of interrupting the grounded neutral conductor in addition to the ungrounded conductor in a power switching circuit.

An additional object is to provide protection to both plug-in equipment and that which requires fixed wiring installation, by providing a sentry system which may be included as part of an attachment plug assembly, as part of the utilization equipment assembly, or as part of an interposed circuit assembly, according to need and convenience.

A further object is to provide an audible indication of error in connecting the utilization equipment to the current source.

A still further object is to provide protection against connective error which is adaptable to d.c. as well as a.c. systems.

BRIEF DESCRIPTION OF THE DRAWINGS

The invention, both as to its organization and principles of operation, together with further objects and advantages thereof, may be better understood by reference to the following detailed description of the embodiment of the invention taken in conjunction with the accompanying drawings in which.

DESCRIPTION OF THE PREFERRED EMBODIMENTS

Figure 1:
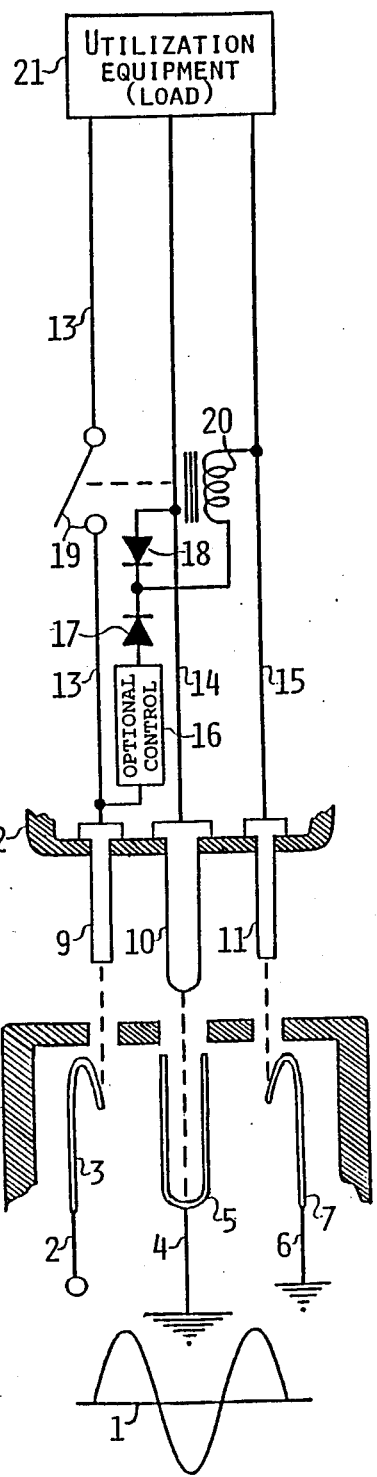
FIG. 1 is a schematic diagram of a preferred embodiment, in accordance with this invention, providing connective protection to electrical utilization equipment which is designed to be energized by connection to an alternating current source by means of a male attachment plug and female receptacle outlet.
Figure 2:
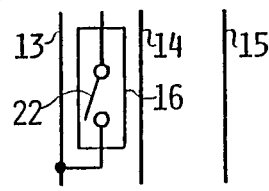
FIG. 2 depicts the optional control of FIG. 1 as comprising a mechanical switch 22.
Figure 3:
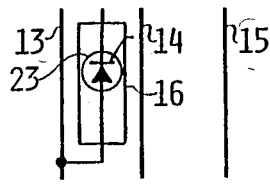
FIG. 3 depicts the optional control of FIG. 1 as comprising a thyristor 23.

Referring now to FIG. 1, the circuit illustrated passes 120 volt, 60 cycle alternating current from the source 1 through ungrounded conductor 2 to the ungrounded contact 3 of receptacle outlet 8 and through grounded conductor 6 to the grounded contact 7 of receptacle outlet 8. A grounding connection is provided by grounding conductor 4 through grounding contact 5 of receptacle outlet 8. Male contacts 9, 10 and 11, of attachment plug 12, are adapted to engage the female connectors 3, 5 and 7, of the receptacle outlet 8, so that conductors 13, 14 and 15 of the sentry circuit, become continuations of receptacle connected conductors 2, 4 and 6 respectively.

Ungrounded conductor 13, adapted to connect utilization equipment or load 21 to current source 1, is interrupted by normally open contacts 19 of electromagnetic relay 20, represented by its coil and core symbols. The coil of relay 20 is connected in series with a first unidirectional blocking means, represented by rectifier diode 17, and also, optionally, in series with a control device 16, which may be a mechanical switch, or a solid state switching device such as a thyristor, between ungrounded conductor 13 and grounded neutral conductor 15 to receive pulsating direct current such as may be represented by half-wave rectified current from the source 1. A second unidirectional blocking means, represented by rectifier diode 18, is connected in series with rectifier diode 17, and also, optionally, in series with the control 16, between ungrounded conductor 13 and grounding conductor 14. Current, that is inductively generated by the magnetic field collapse in the coil of relay 20 between current pulses, is permitted to pass through diode 18 in a closed circuit in which the two ends of the coil of relay 20 are connected through diode 18 and through conductors 14 and 15 through respective grounding and grounded conductors 4 and 6 and their common service grounding. The orientation of the second unidirectional blocking means, represented by rectifier diode 18, serves to block passage of current from ungrounded conductor 13, and thus the source 1, to the grounding conductor 14.

If the ungrounded conductor 2 and the grounded neutral conductor 6 are reversed in their connection to the contacts 3 and 7 of the receptacle 8, ie; 2 being connected to 7 and 6 being connected to 3, both of the rectifier diodes 17 and 18 connect the coil of relay 20 from the now ungrounded conductor 15 to sources of ground potential 13 and 14 in parallel, passing current in the same direction and delivering only half-wave current to the coil of relay 20. Since neither diode is in a position to provide a "free wheeling" effect, the relay 20 does not close properly and the armature tends to vibrate in buzzer fashion, at line frequency, to indicate connective error.

In the much less likely event the ungrounded and grounding connections are reversed, wherein ungrounded conductor 2 is connected to contact 5 of receptacle 8 and the grounding conductor 4 is connectd to contact 3 of receptacle 8, the coil of relay 20 will receive half-wave current through its connection between conductor 14, now ungrounded, and conductor 15, still a grounded neutral, through recifier 18, which now serves as the first rather than the second diode. Diode 17 is now in a position to connect the coil of relay 20, from the point of its connection to rectifier 18, to conductor 13, now a grounding conductor, to provide a "free wheeling" effect. Diode 17 may also make its connection through the switching means of optional control 16 and even be replaced by the switching means, such as a thyristor, as previously described. In this instance, the relay 20 can close properly, but the utilization equipment 21 cannot be energized, and the connection condition would command immediate corrective attention, even without the sentry.

In FIG. 1, it will readily be seen that a fixed wiring of the utilization equipment 21 to the source 1, by connecting conductors 13, 14 and 15 directly to respective conductors 2, 4 and 6, will be afforded the same degree of error protection by the sentry circuit.

While this invention has been described with respect to certain specific embodiments, it will be appreciated that many modifications and changes may be made by those skilled in the art without departing from the inventive concepts or spirit of the invention. It is intended, therefore, by the appended claims to cover all such modifications and changes as fall within the true spirit and scope of the invention.

What is claimed as new and what is desired to be secured by Letters Patent of the United States is:

1. In a system for connecting electrical utilization equipment (21) to a current source means (1), and having ungrounded (2), grounded (6) and grounding (4) conductors, relay means between said source means (1) and said equipment (21) to protect against hazardous misconnections, said relay means comprising an electromagnetic relay (20) having a coil and normally open contacts (19) that interrupt a conductor (13) to said equipment (21) which is correctly connectable to said ungrounded conductor (2), means for providing a source of pulsating direct current (23, 17) to said coil, said coil being coupled between conductors (14, 15) which are correctly connectable to respective grounding and grounded conductors (4, 6), a unidirectional blocking means (18) in series with said coil for blocking passage of said pulsating current to said conductor (14) which is correctly connectable to said grounding conductor (4) and to pass an inductive current generated in said coil between pulses in said pulsating current, said inductive current being passed through said grounding and grounded conductors (14, 15) and their common service grounding connection from one side of said coil to the other side thereof, said pulsating current and said inductive current being sufficient, only in combination, to cause closure of said contacts (19), and to thus pass energizing current from said source means (1) to said equipment (21), passage of said inductive current being interrupted and thus closure of said contacts (19) and use of said equipment (21) being prevented by the absence of a grounding conductor (4) or by a conductor reversal in which said ungrounded conductor (2) is incorrectly connected to said conductor (15) which is correctly connectable to said grounded conductor (6).

2. The system as defined in claim 1 in which said current source means (1) includes a source of alternating current.

3. The system as defined in claim 2 in which said pulsating direct current is half-wave rectified alternating current from said current source means (1).

4. The system as defined in claim 3 in which said source of pulsating direct current includes a rectifier (17).

5. The system as defined in claim 1 in which said pulsating current to said coil of said relay (20) is controlled by an electrical switch having contacts (22).

6. The system as defined in claim 1 in which said pulsating current to said coil of said relay (20) is controlled by a solid state switch (23).

7. The system as defined in claim 6 in which said solid state switch (23) includes a thyristor.

8. The system as defined in claim 1 in which said source of pulsating direct current includes a switching device (23).

9. The system as defined in claim 8 in which the said switching device (23) includes a thyristor.

10. The system as defined in claim 2 in which said source of pulsating direct current includes a thyristor (23).

11. The system as defined in claim 1 in which said unidirectional blocking means includes a rectifier (18).

12. The system as defined in claim 1 in which said relay (20) includes an armature which vibrates in response to said pulsating direct current when said pulsating current is not in combination with said inductive current in order to provide audible indication of connective error between said connectable conductors (13, 14, 15) and respective said ungrounded, grounding and grounded conductors (2, 4, 6) which interrupts the passage of said inductive current.

* * * * *